(12) United States Patent
Kataoka et al.

(10) Patent No.: US 11,693,095 B2
(45) Date of Patent: Jul. 4, 2023

(54) SENSOR MOUNTING STRUCTURE

(71) Applicant: TOYOTA JIDOSHA KABUSHIKI KAISHA, Toyota (JP)

(72) Inventors: Yusuke Kataoka, Toyota (JP); Ryo Iwamatsu, Toyota (JP); Kensaku Shibata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 16/663,792

(22) Filed: Oct. 25, 2019

(65) Prior Publication Data
US 2020/0158828 A1 May 21, 2020

(30) Foreign Application Priority Data
Nov. 20, 2018 (JP) .................................. 2018-217712

(51) Int. Cl.
*G01S 7/481* (2006.01)
*B60R 19/48* (2006.01)

(52) U.S. Cl.
CPC .......... *G01S 7/4813* (2013.01); *B60R 19/483* (2013.01)

(58) Field of Classification Search
CPC ......... B08B 3/02; G02B 27/0006; B05B 1/04; B60S 1/52; B60S 1/0848; B60S 1/56; B60R 11/04
See application file for complete search history.

(56) References Cited

U.S. PATENT DOCUMENTS

| | | | |
|---|---|---|---|
| D859,322 S | * 9/2019 | Takahashi | .................... D13/177 |
| 2010/0078918 A1 | * 4/2010 | Azuma | ............... B60R 21/0132 |
| | | | 280/728.2 |
| 2014/0111950 A1 | * 4/2014 | Yamasaki | ........... B60R 16/0239 |
| | | | 361/747 |
| 2016/0282155 A1 | 9/2016 | Hara | |
| 2017/0036647 A1 | * 2/2017 | Zhao | ......................... B05B 1/04 |
| 2017/0297521 A1 | 10/2017 | Sugie et al. | |
| 2018/0186341 A1 | * 7/2018 | Kimura | ..................... B60S 1/56 |
| 2018/0186342 A1 | 7/2018 | Kubota et al. | |
| 2018/0222450 A1 | * 8/2018 | Kunze | ....................... B60S 1/50 |
| 2021/0170968 A1 | * 6/2021 | Ueda | ..................... G01S 15/931 |

FOREIGN PATENT DOCUMENTS

| | | | |
|---|---|---|---|
| JP | 2002-357653 A | 12/2002 | |
| JP | 2004-306888 A | 11/2004 | |
| JP | 2016-179752 A | 10/2016 | |
| JP | 2017-044636 A | 3/2017 | |
| JP | 2017-193223 A | 10/2017 | |
| WO | 2006/035510 A1 | 4/2006 | |
| WO | 2014/010579 A1 | 1/2014 | |
| WO | 2017/002878 A1 | 1/2017 | |

* cited by examiner

*Primary Examiner* — Luke D Ratcliffe
(74) *Attorney, Agent, or Firm* — Sughrue Mion, PLLC

(57) ABSTRACT

A sensor mounting structure includes: a sensor body that detects peripheral information in relation to a vehicle; and a housing that is formed in a box shape, covers the sensor body from an outer side, and is attached to an outer panel of the vehicle, wherein fastening portions extend from wall surfaces of the housing at one end side and another end side in a direction along the outer panel, and the fastening portions are fastened to the outer panel by fastening members.

4 Claims, 6 Drawing Sheets

SENSOR MOUNTING STRUCTURE

CROSS-REFERENCE TO RELATED APPLICATION

This application claims priority under 35 USC 119 from Japanese Patent Application No. 2018-217712, filed on Nov. 20, 2018, the disclosure of which is incorporated by reference herein.

BACKGROUND

Technical Field

The present disclosure relates to a sensor mounting structure.

Related Art

Japanese Patent Application Laid-open (JP-A) No. 2017-044636 discloses a structure equipped with a radar for detecting peripheral in relation to a vehicle. This structure inhibits interference between a front grille and the radar by providing a recessed portion above the radar.

However, in the structure of JP-A No. 2017-044636, brackets are attached to a back surface and an undersurface of the radar (i.e., sensor), and the radar is attached via these brackets to the vehicle body, so when mounting the radar to another location there is a large spatial constraint and there is room for improvement.

SUMMARY

The present disclosure provides a sensor mounting structure that is less subject to spatial constraints.

A first aspect of the present disclosure is a sensor mounting structure including: a sensor body that detects peripheral information in relation to a vehicle; and a housing that is formed in a box shape, covers the sensor body from an outer side, and is attached to an outer panel of the vehicle, wherein fastening portions extend from wall surfaces of the housing at one end side and another end side in a direction along the outer panel, and the fastening portions are fastened to the outer panel by fastening members.

In the sensor mounting structure of the first aspect, the sensor body is covered from the outer side by the housing, and peripheral information in relation to the vehicle is detected by the sensor body. Furthermore, the housing is formed in a box shape and is attached to the outer panel of the vehicle. Here, a fastening portion extends from the wall surface of the housing at the one end side in the direction along the outer panel, and another fastening portion extends from the wall surface of the housing at the other end side in the direction. Additionally, these fastening portions are fastened to the outer panel by the fastening members. Because of this, the perimeter of the housing excluding the wall surfaces of the housing at the one end side and the other end side in the first direction may be spared from being provided with fastening portions, and interference with peripheral components may be inhibited.

In a second aspect of the present disclosure, in the first aspect, the fastening portions are configured by a first fastening portion and a second fastening portion, which extend from the wall surface of the housing at the one end side, and a third fastening portion, which extends from the wall surface at the other end side.

In the sensor mounting structure of the second aspect, two fastening portions, the first fastening portion and the second fastening portion, are provided at the wall surface of the housing at the one end side in the direction, so the housing may be fastened more securely compared to a case where there is one fastening portion.

In a third aspect of the disclosure, in the second aspect, a connector, to which a wire harness may be connected, is provided at the wall surface of the housing at the other end side.

In the sensor mounting structure of the third aspect, the connector is provided at the wall surface of the housing at the other end side, so other wall surfaces may be spared from being provided with a connector.

A fourth aspect of the present disclosure, in the third aspect, a nozzle for cleaning may be disposed between the first fastening portion and the second fastening portion.

In the sensor mounting structure of the fourth aspect, the space between the first fastening portion and the second fastening portion is utilized to dispose the nozzle, so the space around the housing may be put to effective use compared to a structure where the nozzle is disposed in another location.

A fifth aspect of the present disclosure, in any one of the first to fourth aspects, the housing may be attached to a fender panel that configures the outer panel of the vehicle, and the sensor body may comprise a laser radar that emits electromagnetic waves that function as radar waves.

In the sensor mounting structure of the fifth aspect, peripheral information in the side direction of the vehicle may be detected by emitting the electromagnetic waves of the laser radar from the fender panel.

A sixth aspect of the disclosure, in any one of the first to fourth aspects, the housing is attached to a bumper cover that configures the outer panel of the vehicle, and the sensor body comprises a laser radar that emits electromagnetic waves that function as radar waves.

In the sensor mounting structure of the sixth aspect, peripheral information in the vehicle forward direction or the vehicle rearward direction may be detected by emitting the electromagnetic waves of the laser radar from the bumper cover.

As described above, a sensor mounting structure that is less subject to spatial constraints may be obtained.

BRIEF DESCRIPTION OF THE DRAWINGS

Exemplary embodiments will be described in detail based on the following figures, wherein.

DETAILED DESCRIPTION

First Exemplary Embodiment

Figure 1:
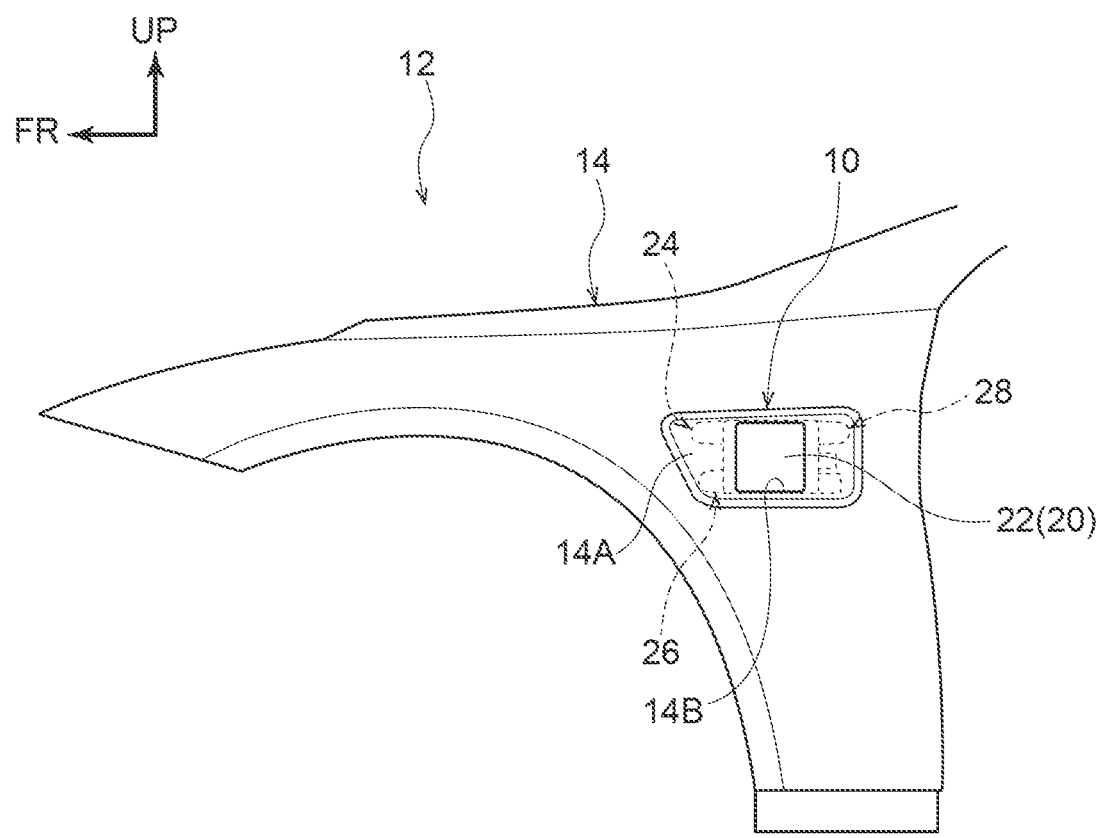
FIG. 1 is a side view schematically illustrating a front fender panel of a vehicle to which a sensor mounting structure pertaining to a first embodiment has been applied.

A sensor mounting structure pertaining to a first exemplary embodiment will be described with reference to the drawings. Arrow FR, arrow UP, and arrow LH appropriately illustrated in the drawings indicate, respectively, a forward direction, an upward direction, and a leftward direction in a width direction of a vehicle. Below, when description is given using the directions of front/rear, upper/lower, and right/left, unless otherwise specified these will be understood to mean front/rear in the vehicle front and rear direction, upper/lower in the vehicle up and down direction, and right/left when facing the vehicle forward direction.

As illustrated in FIG. 1, the sensor mounting structure pertaining to the present exemplary embodiment is applied to a front portion of a vehicle 12. Specifically, a peripheral information detection sensor 10 is attached to a front fender panel 14 provided in the front portion of the vehicle 12.

The front fender panel 14 configures an outer panel of the vehicle and is provided as a pair on the right and left sides of the vehicle. Although only the front fender panel 14 on the vehicle left side is described in the following description, the front fender panel 14 on the vehicle right side also has the same configuration.

The front fender panel 14 is disposed on the upper side of a front wheel not illustrated in the drawings and is gently curved so as to become outwardly convex in the vehicle width direction. The lower end portion of the front fender panel 14 is formed substantially in the shape of a circular arc along the front wheel. Here, a recessed portion 14A that is recessed in a substantially rectangular shape as seen in a vehicle side view is formed in the front fender panel 14. The peripheral information detection sensor 10 is attached to the recessed portion 14A.

Figure 3:
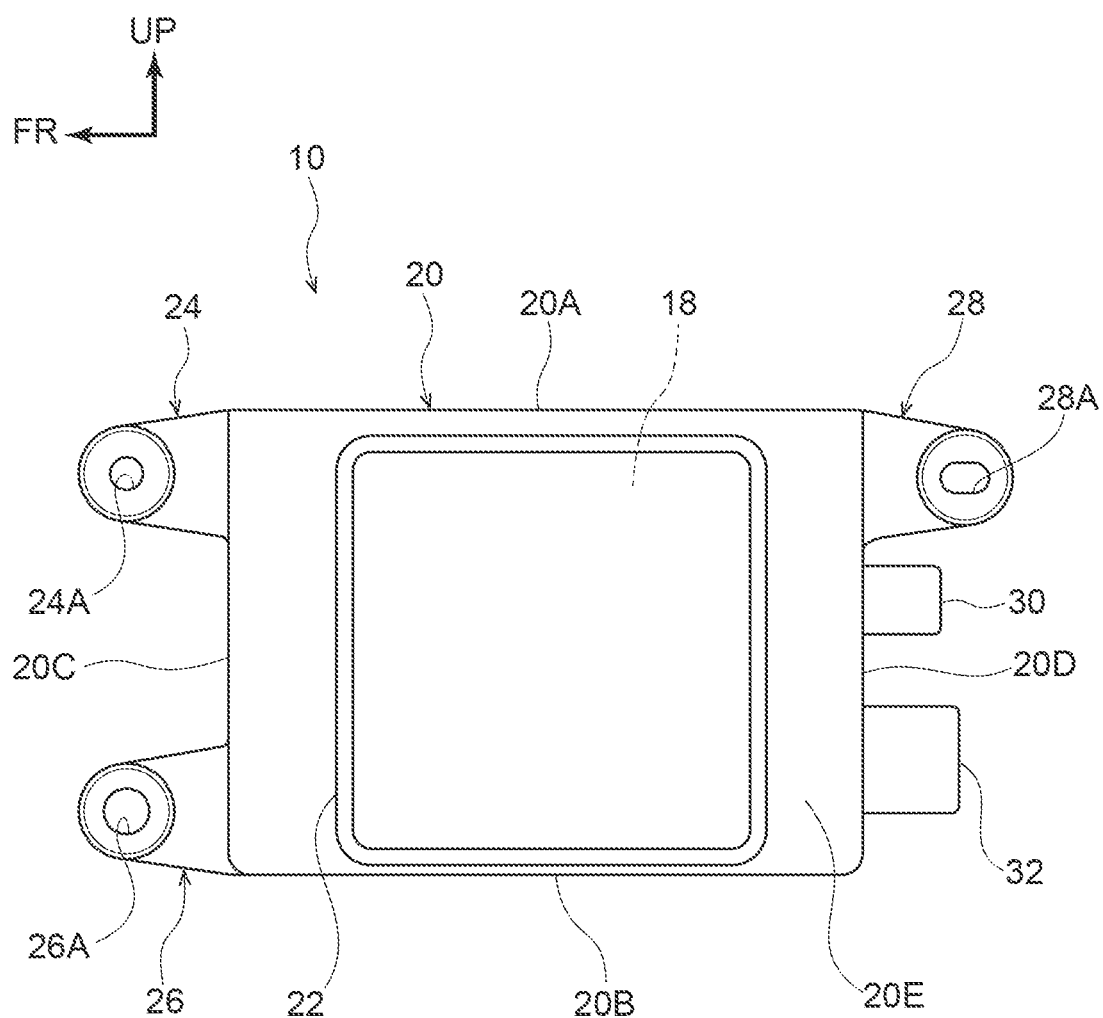
FIG. 3 is a side view, seen from outside in the vehicle width direction in an attached state, of a peripheral information detection sensor of the sensor mounting structure pertaining to the present exemplary embodiment.

As illustrated in FIG. 3, the peripheral information detection sensor 10 is a sensor that detects peripheral information in relation to the vehicle 12 and is configured to include a sensor body 18 and a housing 20. In FIG. 3, arrow FR and arrow UP indicate the vehicle forward direction and the vehicle upward direction in a state in which the peripheral information detection sensor 10 is attached to the vehicle 12.

The sensor body 18 is configured to include a light emitting element (not illustrated in the drawings) that emits electromagnetic waves, a fixed mirror (not illustrated in the drawings) that reflects the electromagnetic waves emitted from the light emitting element, and a movable mirror (not illustrated in the drawings) that reflects, at a predetermined angle, the electromagnetic waves reflected by the stationary mirror. Namely, the sensor body 18 configuring the peripheral information detection sensor 10 of the present exemplary embodiment is a laser radar (light detection and ranging, or LIDAR) that emits electromagnetic waves that function as radar waves.

The housing 20 is formed substantially in the shape of a box, and the sensor body 18 is covered from the outside by the housing 20. The housing 20 is formed in a substantially rectangular shape as seen in a vehicle side view, and a raised portion 22 is formed in the center portion of the housing 20. The raised portion 22 projects further toward a vehicle left side than a general portion of the housing 20. Here, the housing 20 is equipped with an upper wall surface 20A, a lower wall surface 20B, a first side wall surface 20C, a second side wall surface 20D, an outer wall surface 20E, and an inner wall surface 20F (see FIG. 4).

The upper wall surface 20A faces the vehicle upward direction in a state in which the peripheral information detection sensor 10 is attached to the vehicle 12, and the lower wall surface 20B faces the vehicle downward direction. The first side wall surface 20C faces the vehicle forward direction in a state in which the peripheral information detection sensor 10 is attached to the vehicle 12, and the second side wall surface 20D faces the vehicle rearward direction. In the present exemplary embodiment, the vehicle front and rear direction corresponds to the "first direction" in the disclosure, the first side wall surface 20C corresponds to the "wall surface at the one end side in the first direction" in the disclosure, and the second side wall surface 20D corresponds to the "wall surface at the other end side in the first direction."

Figure 4:
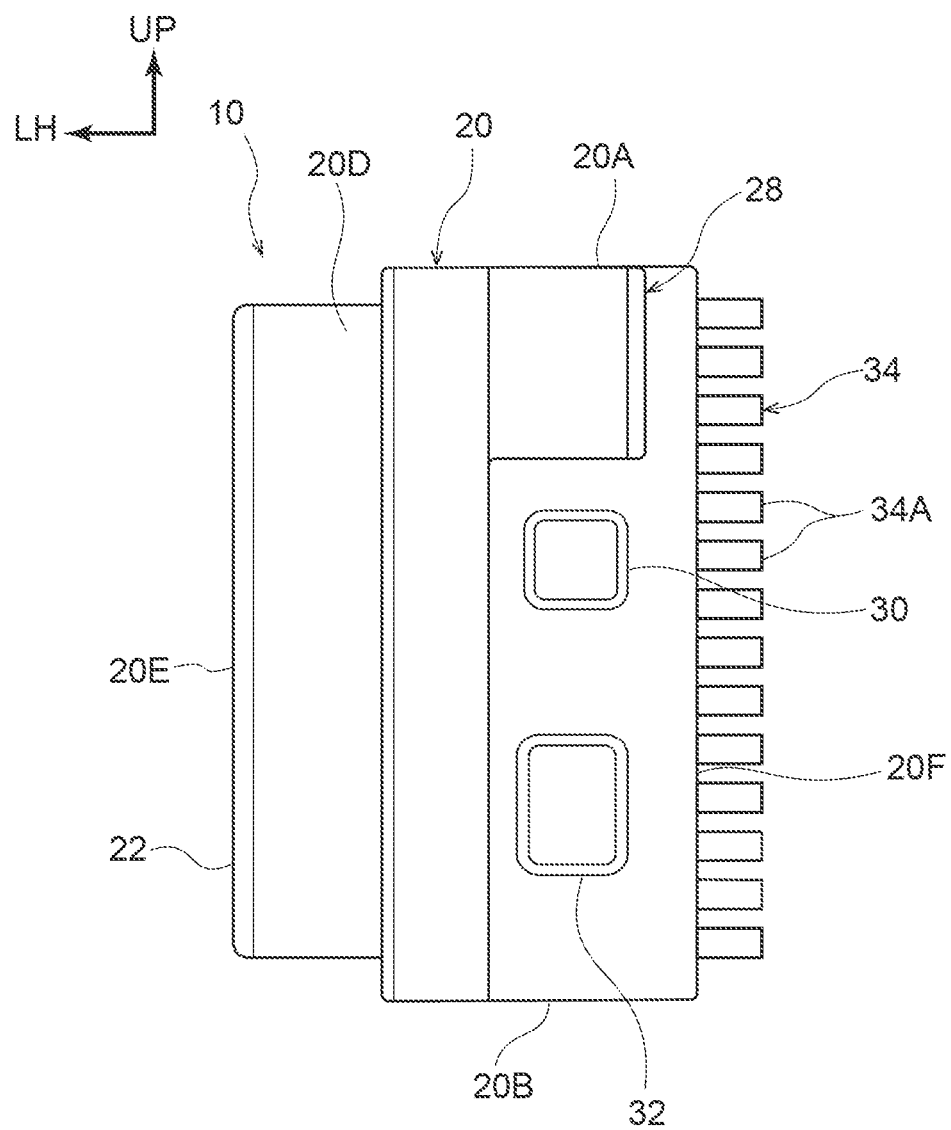
FIG. 4 is a back view, seen from the vehicle rear side in an attached state, of the peripheral information detection sensor of the sensor mounting structure pertaining to the first exemplary embodiment.

As illustrated in FIG. 4, the outer wall surface 20E faces the vehicle leftward direction (the vehicle outer side) in a state in which the peripheral information detection sensor 10 is attached to the vehicle 12, and the inner wall surface 20F faces the vehicle rightward direction (the vehicle inner side).

Here, as illustrated in FIG. 3, a first fastening portion 24 extends in the vehicle forward direction from the upper end portion of the first side wall surface 20C. A first attachment hole 24A that runs through the first fastening portion 24 in the vehicle width direction is formed in the distal end portion of the first fastening portion 24, and a bolt (not illustrated in the drawings) serving as a fastening member is inserted through the first attachment hole 24A. Furthermore, a second fastening portion 26 extends in the vehicle forward direction from the lower end portion of the first side wall surface 20C. A second attachment hole 26A that runs through the second fastening portion 26 in the vehicle width direction is formed in the distal end portion of the second fastening portion 26, and a bolt serving as a fastening member is inserted through the second attachment hole 26A. The second attachment hole 26A is a circular hole with a larger diameter than the first attachment hole 24A formed in the first fastening portion 24.

A third fastening portion 28 extends in the vehicle rearward direction from the upper end portion of the second side wall surface 20D. A third attachment hole 28A that runs through the third fastening portion 28 in the vehicle width direction is formed in the distal end portion of the third fastening portion 28, and a bolt serving as a fastening member is inserted through the third attachment hole 28A. The third attachment hole 28A in the present exemplary embodiment is a long hole whose longitudinal direction coincides with the vehicle front and rear direction.

A first connector 30 is provided at the second side wall surface 20D on the lower side of the third fastening portion 28. Furthermore, a second connector 32 is provided at the lower side of the first connector 30. Connecting portions of the first connector 30 and the second connector 32 face the vehicle rearward direction so that wire harnesses (not illustrated in the drawings) are connected thereto.

As illustrated in FIG. 4, a heat-dissipating component 34 is provided at the inner wall surface 20F. The heat-dissipating component 34 is a known heat sink and is configured by plural pins 34A formed in the shape of rods. Namely, the surface area of the heat-dissipating component 34 is increased by the plural pins 34A, whereby an increase in the internal temperature of the peripheral information detection sensor 10 is inhibited.

As illustrated in FIG. 1, in a state in which the peripheral information detection sensor 10 is attached to the front fender panel 14, the raised portion 22 is inserted from the vehicle inner side through a cutout portion 14B formed in the recessed portion 14A of the front fender panel 14. Furthermore, the first fastening portion 24, the second fastening portion 26, and the third fastening portion 28 of the housing 20 are each fastened to the vehicle inner surface of the recessed portion 14A.

Figure 2:
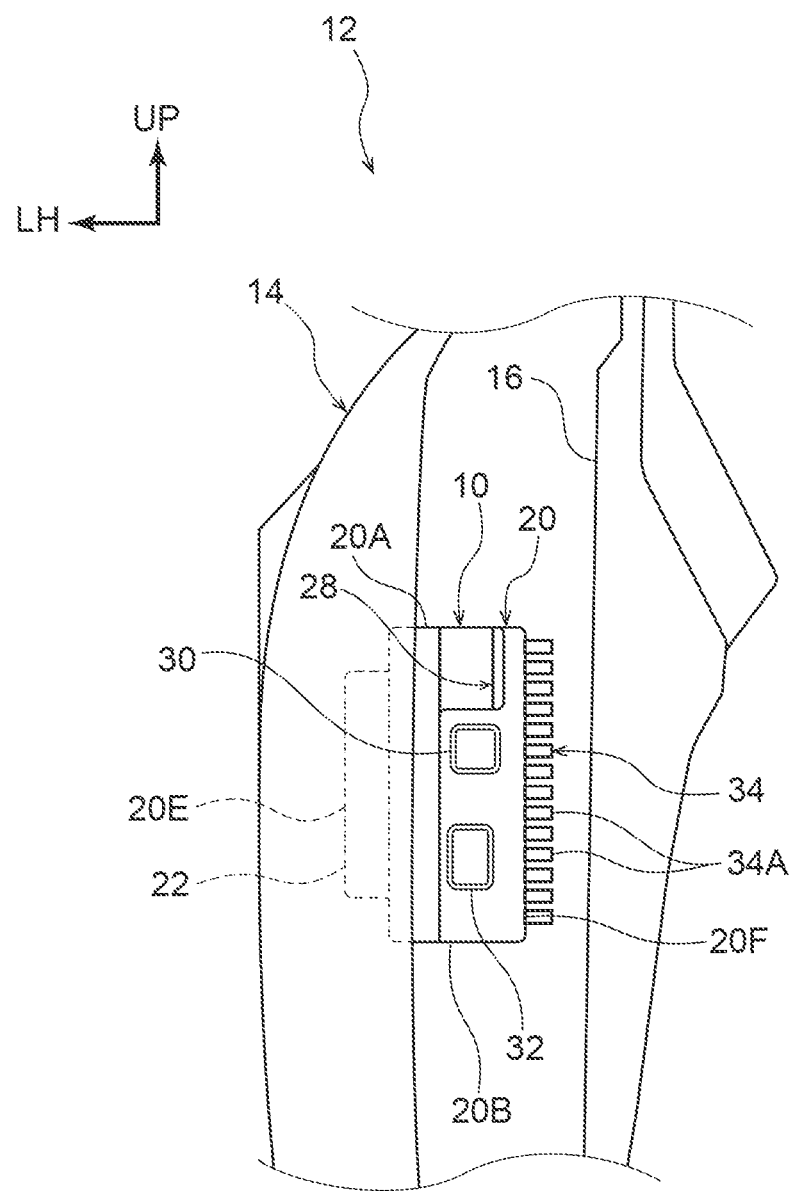
FIG. 2 is a back view, seen from the vehicle rear side, of relevant portions of the vehicle to which the sensor mounting structure pertaining to the first embodiment has been applied.

As illustrated in FIG. 2, an inner panel 16 is disposed on the vehicle width direction inner side of the front fender panel 14. The peripheral information detection sensor 10 is disposed in a space between the front fender panel 14 and the inner panel 16.

(Operation)

Next, the action of the present exemplary embodiment will be described.

In the sensor mounting structure of the present exemplary embodiment, the peripheral information detection sensor 10 is attached to the front fender panel 14, and peripheral information in the side direction of the vehicle may be detected by emitting the electromagnetic waves of the laser radar from the peripheral information detection sensor 10.

Furthermore, the first fastening portion 24 and the second fastening portion 26 extend from the first side wall surface 20C of the housing 20 of the peripheral information detection sensor 10, and the third fastening portion 28 extends from the second side wall surface 20D. Additionally, the first fastening portion 24, the second fastening portion 26, and the third fastening portion 28 are fastened to the front fender panel 14 by bolts. Because of this, the wall surfaces of the housing 20 excluding the first side wall surface 20C and the second side wall surface 20D—namely, the upper wall surface 20A, the lower wall surface 20B, the outer wall surface 20E, and the inner wall surface 20F—may be formed as flat surfaces, and interference with peripheral components around the peripheral information detection sensor 10 may be inhibited. In the present exemplary embodiment, as illustrated in FIG. 2, the inner panel 16 is disposed on the vehicle width direction inner side of the peripheral information detection sensor 10, but in this case also, interference between the peripheral information detection sensor 10 and the inner panel 16 may be inhibited.

Furthermore, the housing 20 may be fastened more securely compared to a configuration where only one of the first fastening portion 24 and the second fastening portion 26 is formed on the first side wall surface 20C. Moreover, it becomes easier to ensure space around the upper wall surface 20A, the lower wall surface 20B, the outer wall surface 20E, and the inner wall surface 20F, so the ability to dissipate the heat of the peripheral information detection sensor 10 may be improved.

Moreover still, in the present exemplary embodiment, the first connector 30 and the second connector 32 are provided at the second side wall surface 20D. In this way, by consolidating the third fastening portion 28, the first connector 30, and the second connector 32 on the second side wall surface 20D, other wall surfaces of the housing 20 may be spared from being provided with a connector, and interference with peripheral components may be effectively inhibited.

Furthermore, as illustrated in FIG. 2, the first connector 30 and the second connector 32 are provided facing the space between the front fender panel 14 and the inner panel 16, so the wire harnesses may be disposed in this space.

Second Exemplary Embodiment

Next, a sensor mounting structure pertaining to a second exemplary embodiment will be described. Configurations that are the same as those in the first exemplary embodiment are assigned the same reference signs, and description thereof will be omitted as appropriate.

Figure 5:
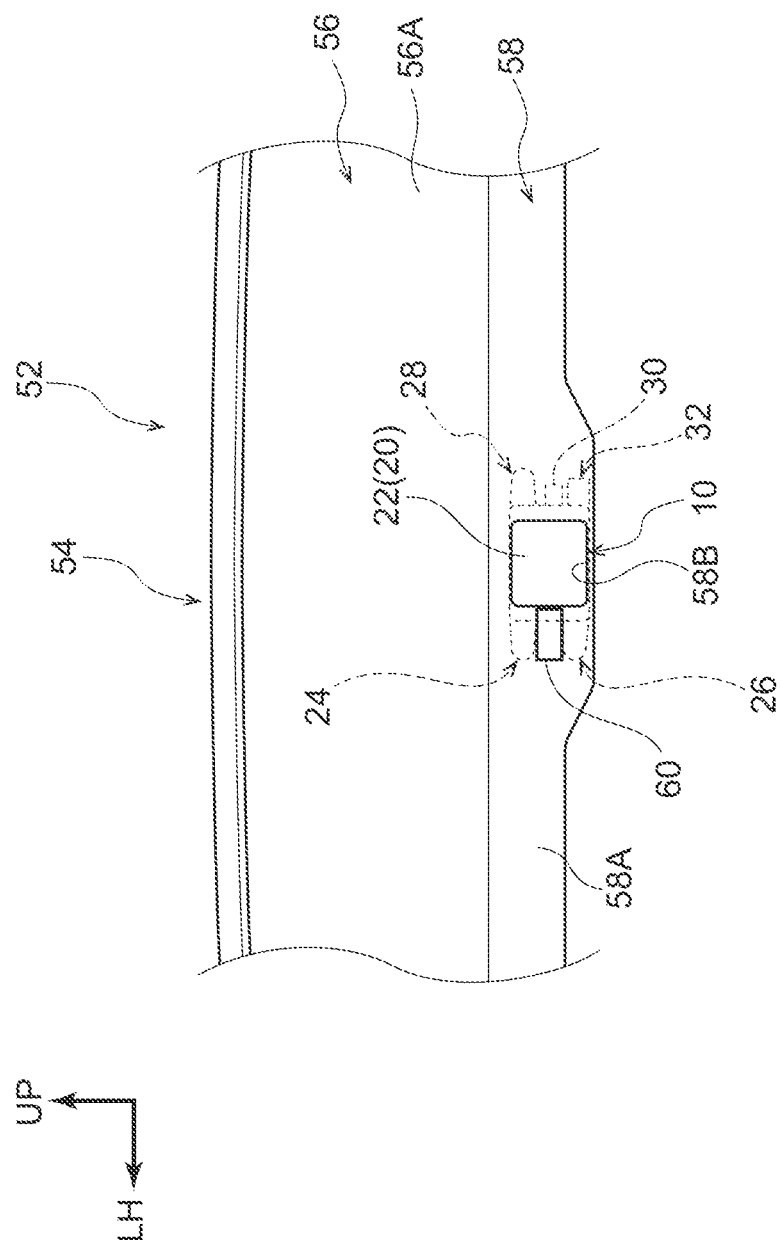
FIG. 5 is a back view, seen from the vehicle rear side, of a rear bumper cover of a vehicle to which a sensor mounting structure pertaining to a second exemplary embodiment has been applied.

As illustrated in FIG. 5, in the present exemplary embodiment, the peripheral information detection sensor 10 is attached to a rear bumper cover 54 disposed in a vehicle rear portion of a vehicle 52. The rear bumper cover 54 pertaining to the present exemplary embodiment is configured to include an upper panel 56, which configures the vehicle upper side of the rear bumper cover 54, and a lower panel 58, which configures the vehicle lower side of the rear bumper cover 54. The peripheral information detection sensor 10 is attached to the vehicle width direction center portion of the lower panel 58. Here, in the present exemplary embodiment, the vehicle width direction corresponds to the "first direction" in the disclosure.

The lower panel 58 is equipped with a lower panel vertical wall portion 58A that configures a design surface, and a cutout portion 58B that is substantially rectangular in shape as seen from the vehicle rear side is formed in the lower panel vertical wall portion 58A. The raised portion 22 formed in the housing 20 of the peripheral information detection sensor 10 is inserted from the vehicle front side (the vehicle inner side) through the cutout portion 58B.

Here, the peripheral information detection sensor 10 is the same laser radar as in the first exemplary embodiment. For this reason, the peripheral information detection sensor 10 is configured to be able to detect information in the rearward direction of the vehicle 52 by emitting the electromagnetic waves that function as radar waves in the vehicle rearward direction from the peripheral information detection sensor 10 and receiving the reflected light.

Figure 6:
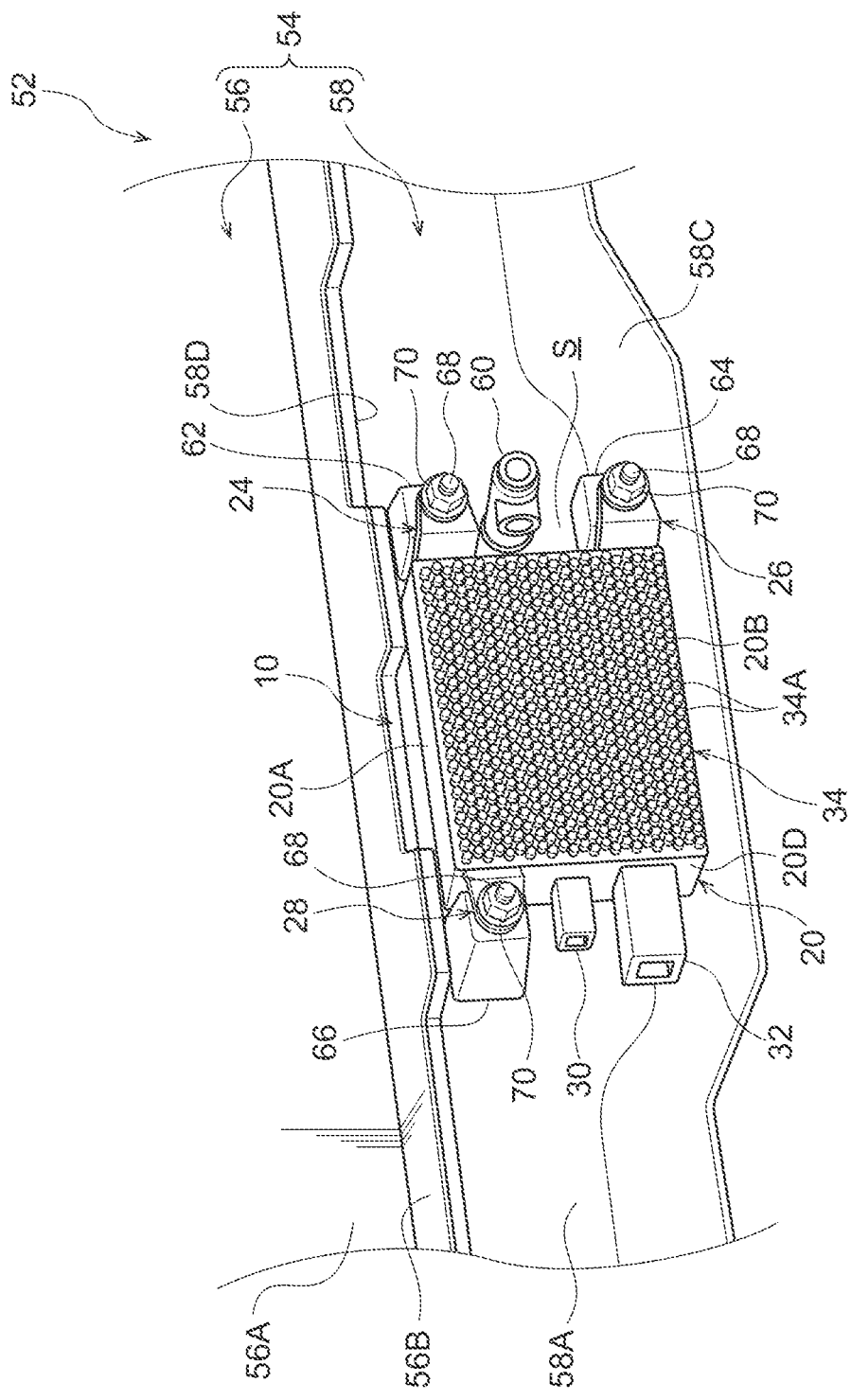
FIG. 6 is an enlarged front view, seen from the vehicle front side, of relevant portions of the rear bumper cover of the vehicle to which the sensor mounting structure pertaining to the second exemplary embodiment has been applied.

As illustrated in FIG. 6, the upper panel 56 configuring the rear bumper cover 54 is equipped with an upper panel vertical wall portion 56A that configures a design surface. An upper panel attachment piece 56B extends in the vehicle forward direction from the lower end portion of the upper panel vertical wall portion 56A.

A lower panel attachment piece 58D extends in the vehicle forward direction from the upper end portion of the lower panel vertical wall portion 58A of the lower panel 58. The lower panel attachment piece 58D is superposed on the undersurface of the upper panel attachment piece 56B of the upper panel 56. The upper panel attachment piece 56B and the lower panel attachment piece 58D are secured to each other by securing means not illustrated in the drawings.

A lower panel flange 58C extends in the vehicle forward direction from the lower end portion of the lower panel vertical wall portion 58A of the lower panel 58. The undersurface of the rear bumper cover 54 is configured by the lower panel flange 58C.

Here, a first mounting seat 62, a second mounting seat 64, and a third mounting seat 66 are formed on the lower panel vertical wall portion 58A of the lower panel 58. The first mounting seat 62 projects from a position offset to the vehicle left side of the vehicle width direction center portion of the lower panel vertical wall portion 58A, and a stud bolt 68 projects from the first mounting seat 62. The stud bolt 68 is inserted through the first fastening portion 24 of the peripheral information detection sensor 10, and a nut 70 is screwed from the vehicle front side onto the stud bolt 68, whereby the first fastening portion 24 is fastened to the first mounting seat 62.

The second mounting seat 64 is provided at the lower side of the first mounting seat 62 and projects in the vehicle forward direction from the lower panel vertical wall portion 58A. A stud bolt 68 that projects from the second mounting seat 64 is inserted through the second fastening portion 26 of the peripheral information detection sensor 10, and a nut 70 is screwed from the vehicle front side onto the stud bolt 68, whereby the second fastening portion 26 is fastened to the second mounting seat 64.

The third mounting seat 66 is provided at the vehicle right side of the first mounting seat 62 and projects in the vehicle forward direction from the lower panel vertical wall portion 58A. A stud bolt 68 that projects from the third mounting seat 66 is inserted through the third fastening portion 28 of the peripheral information detection sensor 10, and a nut 70 is screwed from the vehicle front side onto the stud bolt 68, whereby the third fastening portion 28 is fastened to the third mounting seat 66.

Here, a nozzle 60 for cleaning is disposed in a space S between the first fastening portion 24 and the second fastening portion 26. The nozzle 60 is formed substantially in the shape of an open cylinder that extends in the vehicle front and rear direction. As illustrated in FIG. 5, one end portion of the nozzle 60 is positioned on the vehicle rear side through the lower panel 58 and faces the peripheral information detection sensor 10. As illustrated in FIG. 6, the other end portion of the nozzle 60 is bent in the vehicle rightward direction and has a hose not illustrated in the drawings connected to it. In this way, by flowing a cleaning liquid through the inside of the hose not illustrated in the drawings, the cleaning liquid may be sprayed onto the surface of the peripheral information detection sensor 10 from the one end portion of the nozzle 60.

(Operation)

Next, the action of the present exemplary embodiment will be described.

In the sensor mounting structure of the present exemplary embodiment, the peripheral information detection sensor 10 is attached to the rear bumper cover 54, so peripheral information in the vehicle forward direction or the vehicle rearward direction may be detected by emitting the electromagnetic waves of the laser radar from the rear bumper cover 54.

Furthermore, in the present exemplary embodiment, the space S between the first fastening portion 24 and the second fastening portion 26 of the housing 20 is utilized to dispose the nozzle 60, so the space around the housing 20 may be put to effective use compared to a structure where the nozzle 60 is disposed in another location.

Moreover, in the present exemplary embodiment, the upper panel attachment piece 56B and the lower panel attachment piece 58D are provided at the upper end portion of the lower panel 58, and the lower panel flange 58C is provided at the lower end portion of the lower panel 58, so there are spatial constraints above and below the peripheral information detection sensor 10. Even in this kind of structure where there are spatial constraints, the peripheral information detection sensor 10 may be attached because there are no projecting portions such as fastening portions on the top and bottom of the peripheral information detection sensor 10. Other actions are the same as those of the first exemplary embodiment.

Embodiments have been described above, but the disclosure may of course be implemented in a variety of ways in a range that does not depart from the spirit thereof. For example, in the above exemplary embodiments, the first fastening portion 24 and the second fastening portion 26 are provided at the one end portion of the housing 20 and the third fastening portion 28 is provided at the other end portion of the housing 20, but the housing 20 is not limited to this. Namely, the sensor mounting structure may also be configured as a structure where just the first fastening portion 24 is provided at the one end portion of the housing 20, so that the housing 20 is fastened to the vehicle body by two fastening portions, the first fastening portion 24 and the third fastening portion 28.

Furthermore, in the above exemplary embodiments, the third fastening portion 28 is provided at the upper portion of the housing 20, but the third fastening portion 28 is not limited to this and may also be provided at the lower portion of the housing 20. Namely, the sensor mounting structure may also be configured as a structure where the third fastening portion 28 extends in the vehicle rightward direction from the lower end portion of the second side wall surface 20D of the housing 20.

Moreover, in the first exemplary embodiment an example was described where the peripheral information detection system 10 is attached to the front fender panel 14, and in the second exemplary embodiment an example was described where the peripheral information detection sensor 10 is attached to the rear bumper cover 54, but the sensor mounting structure is not limited to this. The peripheral information detection sensor 10 may also be attached to another location, such as, for example, a rear fender panel, a front bumper cover, a front pillar, and a roof rail.

Moreover, in the above exemplary embodiments, the sensor body 18 of the peripheral information detection sensor 10 is a laser radar that emits the electromagnetic waves that function as radar waves, but the sensor body 18 is not limited to this and may also be another sensor. For example, the sensor body 18 may also be applied to another sensor as long as it is a sensor capable of detecting peripheral information in relation to the vehicle 52, such as a millimeter-wave radar, an ultrasonic sensor, and an optical camera. In a case where the sensor body 18 is a sensor that detects peripheral information by visible light, it suffices for the structure to be able to allow visible light to pass through, such as making part of the housing 20 transparent.

What is claimed is:

1. A sensor mounting structure, comprising:
    a sensor body that detects peripheral information in relation to a vehicle; and
    a housing that is formed in a box shape, covers the sensor body from an outer side, and is attached to an outer panel of the vehicle,
    wherein fastening portions extend from wall surfaces of the housing at one end side and another end side in an extension direction along the outer panel, and the fastening portions are fastened to the outer panel by fastening members, and
    wherein the fastening portions are configured by a first fastening portion and a second fastening portion, which extend linearly in a same direction from the wall surface of the housing at the one end side, and a third fastening portion, which extends from the wall surface at the other end side in a direction opposite to the extension direction of the first fastening portion and the second fastening portion, and wherein a connector, to which a wire harness is connected, is provided at the wall surface of the housing at the other end side, wherein a nozzle is disposed between the first fastening portion and the second fastening portion, a first portion of the nozzle is formed in a cylinder shape that extends in a front-rear direction of the vehicle, and an end faces toward the sensor so as to be configured to clean a surface of the sensor.

2. The sensor mounting structure according to claim 1, wherein:
   the housing is attached to a fender panel that configures the outer panel of the vehicle, and
   the sensor body comprises a laser radar that emits electromagnetic waves that function as radar waves.

3. The sensor mounting structure according to claim 1, wherein:
   the housing is attached to a bumper cover that configures the outer panel of the vehicle, and
   the sensor body comprises a laser radar that emits electromagnetic waves that function as radar waves.

4. The sensor mounting structure according to claim 2, wherein:
   a recessed portion that is recessed inwardly in a vehicle width direction is provided at the fender panel,
   a raised portion is formed in the housing, and
   the raised portion is inserted from a vehicle inner side through a cutout portion formed in the recessed portion.

* * * * *